United States Patent [19]

Kaneko

[11] Patent Number: 5,327,551
[45] Date of Patent: Jul. 5, 1994

[54] SYSTEM USING COPY OF CURRENT POINTER SAVED BEFORE CHANGING A SELECTIVELY RESTORING ORIGINAL DATA BASED UPON STATUS OF UPDATING FLAG

[75] Inventor: Masamichi Kaneko, Zama, Japan
[73] Assignee: Fujitsu Limited, Kawasaki, Japan
[21] Appl. No.: 661,599
[22] Filed: Feb. 28, 1991

[30] Foreign Application Priority Data

Mar. 2, 1990 [JP] Japan .................................. 2-051313

[51] Int. Cl.$^5$ ............................................. G06F 11/16
[52] U.S. Cl. ................................... 395/575; 371/10.1; 364/266.5; 364/268.5; 364/285; 364/DIG. 1; 364/944.2
[58] Field of Search ............... 364/DIG. 1, DIG. 2; 395/425, 575, 600; 371/10.1, 10.2

[56] References Cited

U.S. PATENT DOCUMENTS

| | | | |
|---|---|---|---|
| 3,969,723 | 7/1976 | Kennicott | 364/200 |
| 4,459,658 | 7/1984 | Gabbe et al. | 395/575 |
| 4,648,036 | 3/1987 | Gallant | 395/600 |
| 4,805,095 | 2/1989 | Armstrong et al. | 364/200 |
| 4,814,971 | 3/1989 | Thatte | 395/575 |
| 4,823,261 | 4/1989 | Bank et al. | 395/200 |
| 4,945,474 | 7/1990 | Elliott et al. | 395/575 |
| 5,008,786 | 4/1991 | Thatte | 395/425 |
| 5,008,814 | 4/1991 | Mathur | 364/200 |
| 5,043,866 | 8/1991 | Myre, Jr. et al. | 395/600 |
| 5,043,871 | 8/1991 | Nishigaki et al. | 395/600 |
| 5,163,148 | 10/1992 | Walls | 395/600 |
| 5,210,854 | 5/1993 | Beaverton et al. | 395/500 |

OTHER PUBLICATIONS

Ouchi, N. K. et al., "Check Point Copy for a Two-Stage Store", *IBM Technical Disclosure Bulletin*, vol. 20, No. 5, Oct. 1977, pp. 1955–1958.

*Primary Examiner*—Thomas C. Lee
*Attorney, Agent, or Firm*—Staas & Halsey

[57] ABSTRACT

A system for executing an updating or restoring method for stored data groups in a nonvolatile storage device provides a data storage portion having a first data domain and a second data domain which make up one pair and are an object to be updated. An information management table manages a pointer and a current pointer corresponding to each of the data domains. A pointer updating log management table temporarily stores the current pointer when the data domain is updated. A data updating processor updates data by temporarily storing the current pointer, by updating the first or the second data domain, and by transferring the current pointer, when data is updated. A data restoring processor restores information in the data domain before updating by restoring the contents of the current pointer, when data is restored after interruption of the updating operation. Thus, high speed data updating and restoring can be carried out.

7 Claims, 7 Drawing Sheets

SYSTEM USING COPY OF CURRENT POINTER SAVED BEFORE CHANGING A SELECTIVELY RESTORING ORIGINAL DATA BASED UPON STATUS OF UPDATING FLAG

BACKGROUND OF THE INVENTION

1. Field of the Invention

The present invention relates to an updating or restoring method for stored data groups and a system for executing the same, wherein when the updating of the data group stored in a nonvolatile storage device fails, the data group can be restored with consistency.

2. Description of the Related Art

In a data processing system, a nonvolatile storage device is used wherein if a main power supply of the system fails, stored information is protected by a battery back up or some other means. The above nonvolatile storage device can be accessed by an instruction which is used for accessing a main storage device instead of an instruction applied to an input or output device. As a result, the nonvolatile storage device can be accessed or updated at high speed. A data updating or restoring system suitable for the above nonvolatile storage device is desired.

As an updating system for use when a failure during an updating process occurs the following two systems have been utilized.

First system:

The data before updating is temporarily transferred to another storage device or the like, and after that the original data is updated. The temporarily transferred data is referred to as a pre-update log. When an updating process is interrupted by a failure, the data lost by the interruption is taken from the pre-update log and restored.

Second system:

First, the new data to be updated is temporarily stored in another storage device or the like, and the data to be updated is then updated. The temporarily stored data is referred to as a post-update log. When an updating process is interrupted by a failure, the data is updated again using the post update log.

In the above conventional systems, either the pre-update log or post-update log must be stored in another storage device or the like in advance. Thus, when the data is updated, an excessive number of write operations are necessary to store the log data. Also, in the restoring process after interruption of the updating, the stored data must be read and transferred to the data domain to be updated again. Accordingly, a long time is necessary to carry out the updating process as well as the restoring process because of the necessity of writing and reading the data. As a result, problems arise.

SUMMARY OF THE INVENTION

An object of the present invention is to provide an updating or restoring method for stored data groups and a system for executing the same wherein high speed data updating and restoring processes can be carried out.

In one aspect of the present invention there is provided an updating or restoring method for stored data groups in a data processing system having a nonvolatile storage device including a data storage portion comprising pairs of data domains, an information management table for managing a current pointer, and a pointer updating log management table temporarily storing the current pointer, the method comprising a first step wherein the contents of all pointers for current data domains set in the information management table are stored in the pointer updating log management table; a second step wherein the content of one of the paired data domains which are an object to be updated designated by the current pointer is transferred to another domain when it is necessary for data updating to be carried out; a third step wherein the contents of the current pointer are changed in response to the above transfer operation; and if the process is interrupted during the above steps, further comprising a fourth step wherein all the contents of the current pointer before updating set in the pointer updating log management table are set to the current pointer of the information management table.

In another aspect of the present invention there is provided a system for executing an updating or restoring method for stored data groups in a nonvolatile storage device comprising a data storage portion having a first data domain and a second data domain which comprise one pair and are an object to be updated; an information management table for managing a pointer corresponding to the first data domain, a pointer corresponding to the second data domain, and a current pointer corresponding to a data domain which stores currently valid data; a pointer updating log management table for temporarily storing the current pointer when the data is updated; a data updating processor for updating data by temporarily storing the current pointer in the pointer updating log management table, updating the first or the second data domain, and transferring the current pointer, when data is updated; a data restoring processor for restoring information in the data domain before updating by restoring the contents of the current pointer temporarily stored in the pointer updating log management table when data is restored after interruption of the updating operation.

Other features and advantages of the invention will be apparent from the following description with reference to the accompanying drawings.

BRIEF DESCRIPTION OF THE DRAWINGS

FIG. 4 which comprises FIG. 4-1 and FIG. 4-2 is a flowchart showing process steps in a data updating process of the embodiment of FIG. 1;

DESCRIPTION OF THE PREFERRED EMBODIMENT

The system of an embodiment according to the present invention is explained with reference to FIG. 1.

Figure 1:
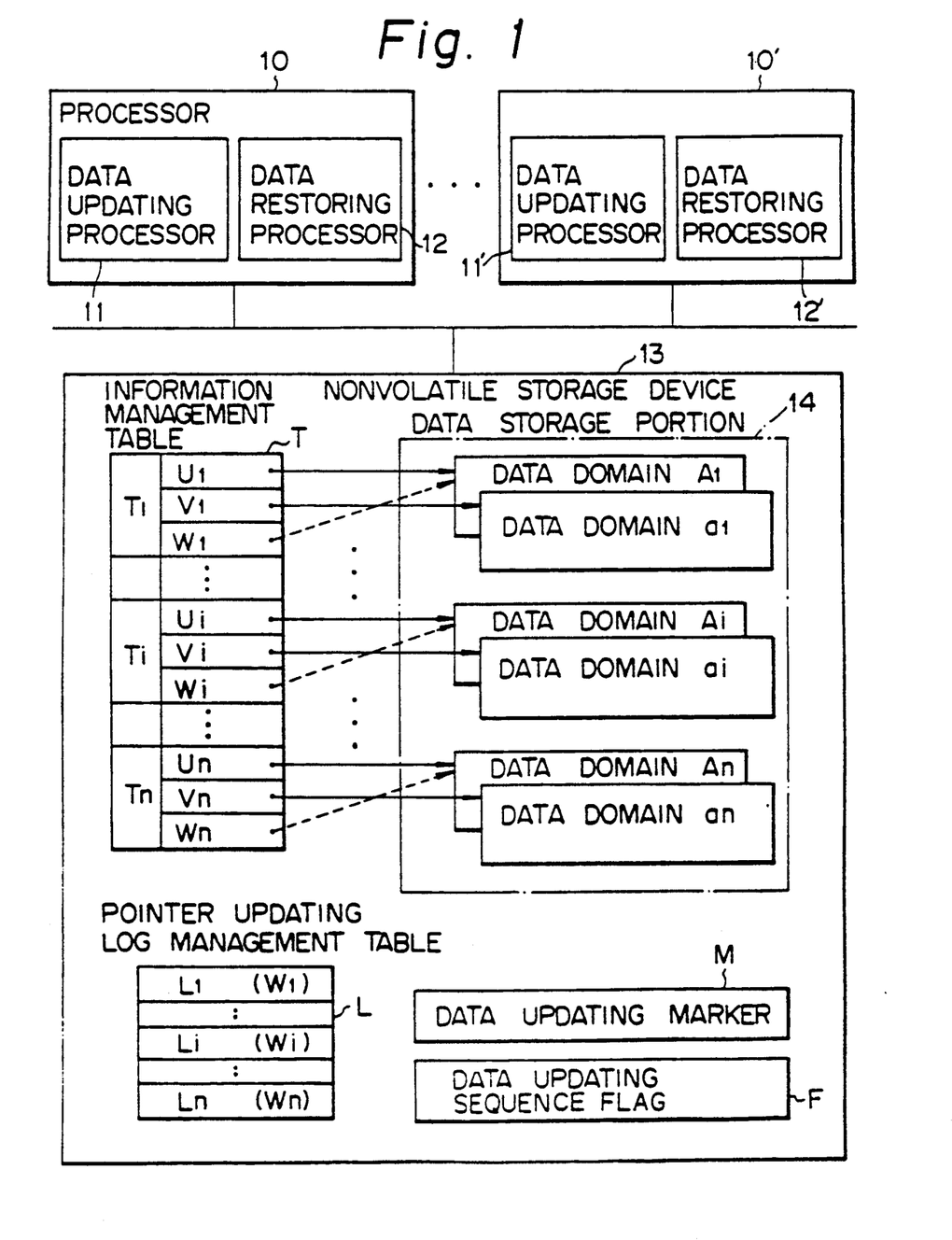
FIG. 1 is a block diagram explaining an embodiment according to the present invention.

In FIG. 1, reference numerals 10 and 10' are processors each comprising a CPU (central processing unit), and a memory or the like, 11 and 11' are data updating processors, 12 and 12' are data restoring processors, 13 is a nonvolatile storage device wherein if a main power supply of the system fails the stored data is not lost, 14 is a data storage portion wherein data to be updated is stored, Ai (i=1, 2, ..., n) is a first data domain and ai is a second data domain, wherein Ai and ai form a pair, T is an information management table storing pointers corresponding to the data domains, L is a pointer updating log management table for temporarily storing the pointers, M is a data updating marker for designating whether data has been updated or not, and F is a data updating sequence flag indicating a data updating sequence.

In this embodiment, the data storage portion 14 comprises the first data domains A1 to An and the second data domains a1 to an, and the information management table T manages or controls all pairs of domains.

Each entry Ti of the information management table T comprises a pointer Ui pointing to the first data domain Ai, a pointer Vi pointing to the second data domain ai, and a current pointer Wi pointing to a data domain storing currently valid data.

The pointer updating log management table L temporarily stores the current pointer Wi when a data domain is being updated.

The data updating processor 11 obtains priority for updating data using the data updating sequence flag F to control sequential updating of data in cooperation with another run unit (program processing unit). Then, all the current pointers Wi corresponding to the each of the data domain groups to be updated are stored in the pointer updating log management table L, the data updating marker M is set, each data domain combined in a pair with another data domain pointed to by the current pointer Wi is updated, and the content of the current pointer Wi is changed to the value that points to the paired one domain. After the updating is completed, the data updating marker M is reset.

If a failure occurs during the updating, an incomplete update is detected while the data updating marker M is ON, and the data restoring processor 12 starts to operate. The data restoring processor 12 again sets all the contents of the Li updated in the pointer updating log management table L to the current pointer Wi in the information management table T, and the contents of the data domains Ai and ai are restored to the pre-update state.

Figure 2A:
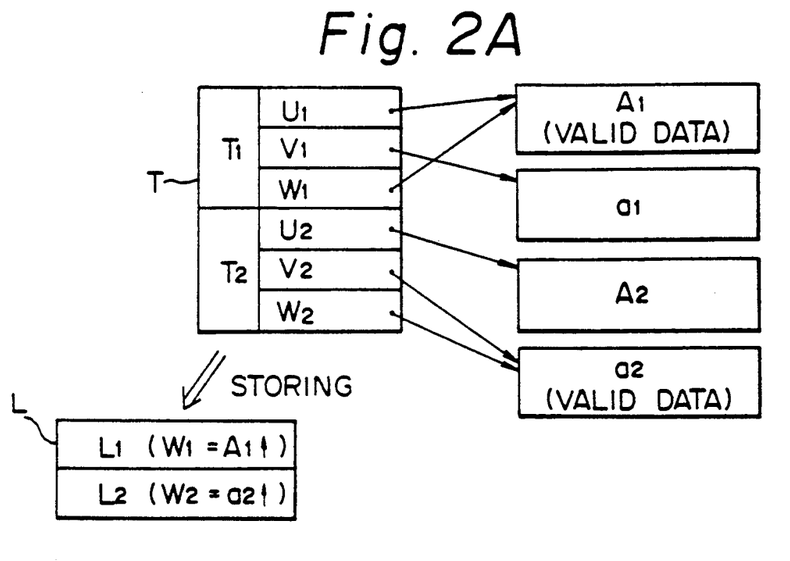
FIG. 2A and FIG. 2B are block diagrams for explaining the embodiment of FIG. 1 in more detail.
Figure 2B:
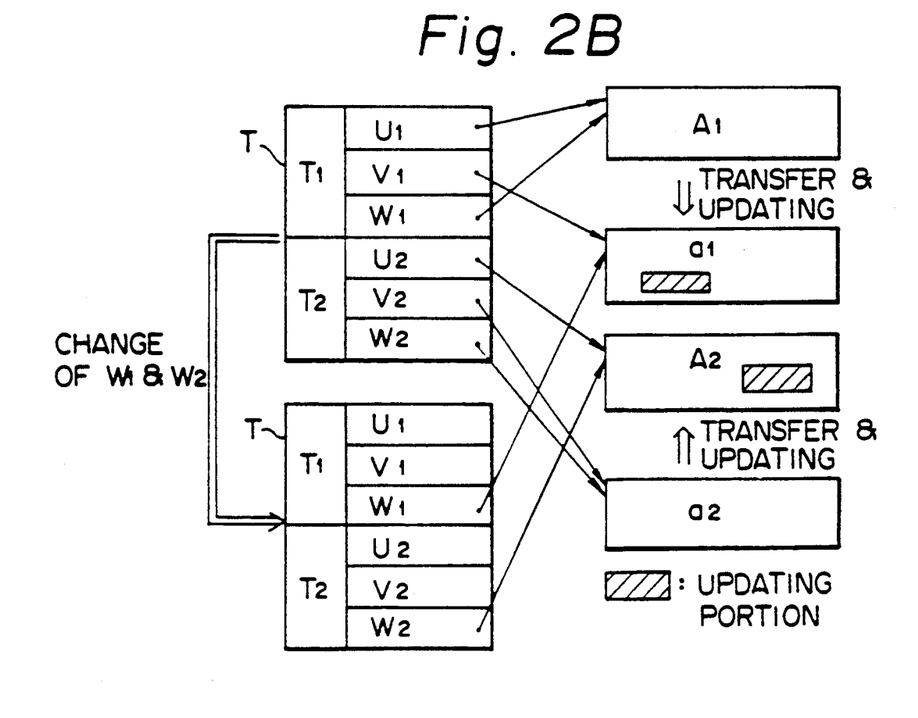
Figure 3:
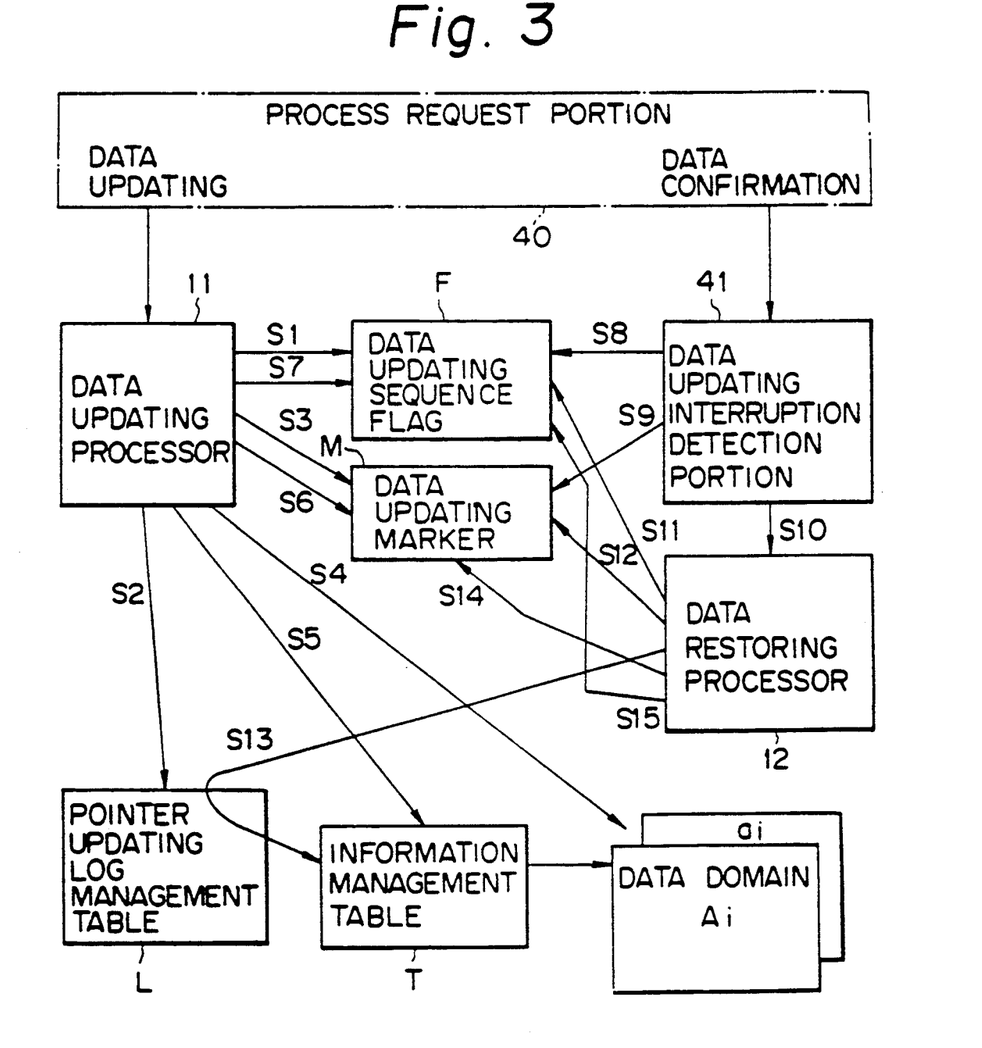
FIG. 3 is a block diagram for explaining process instructions transferred between elements in a system of the embodiment of FIG. 1.
Figures 4A, 4B:
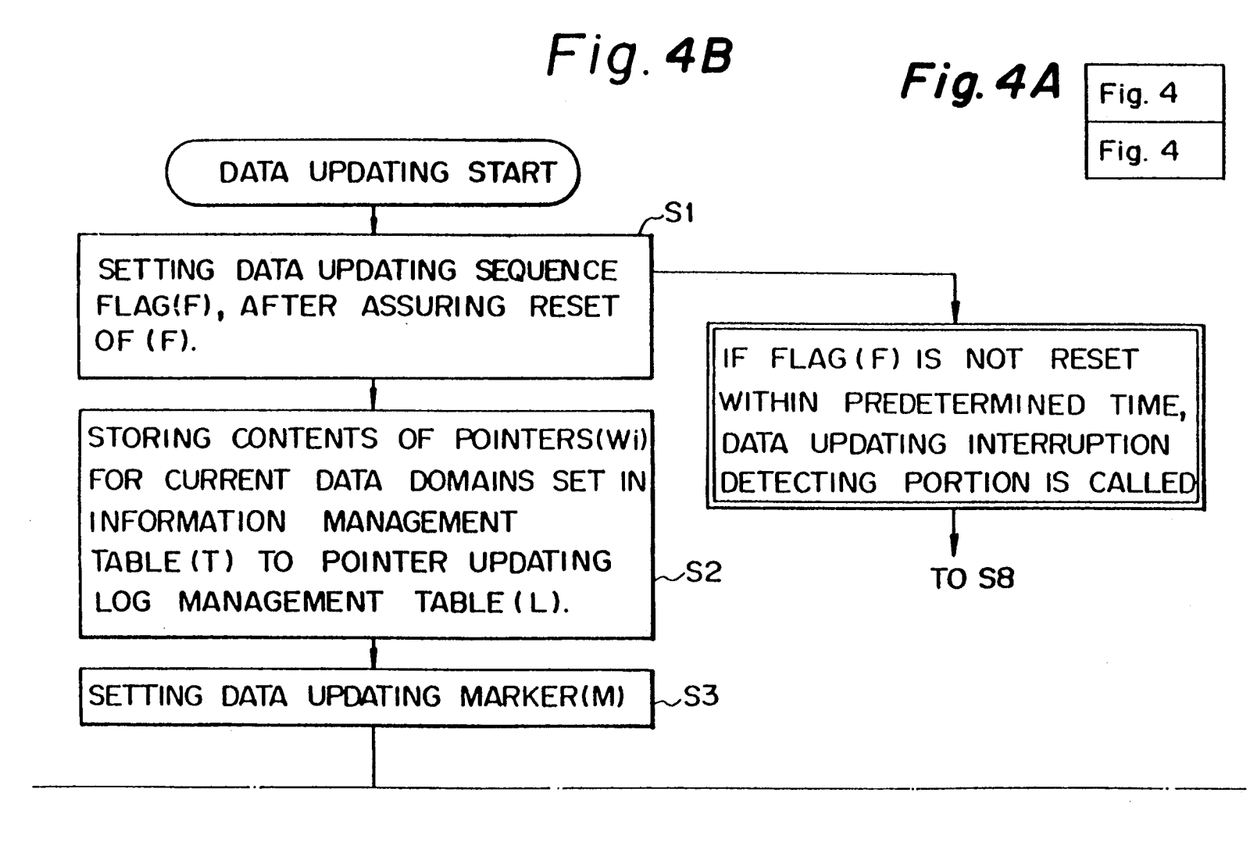
Figure 4C:
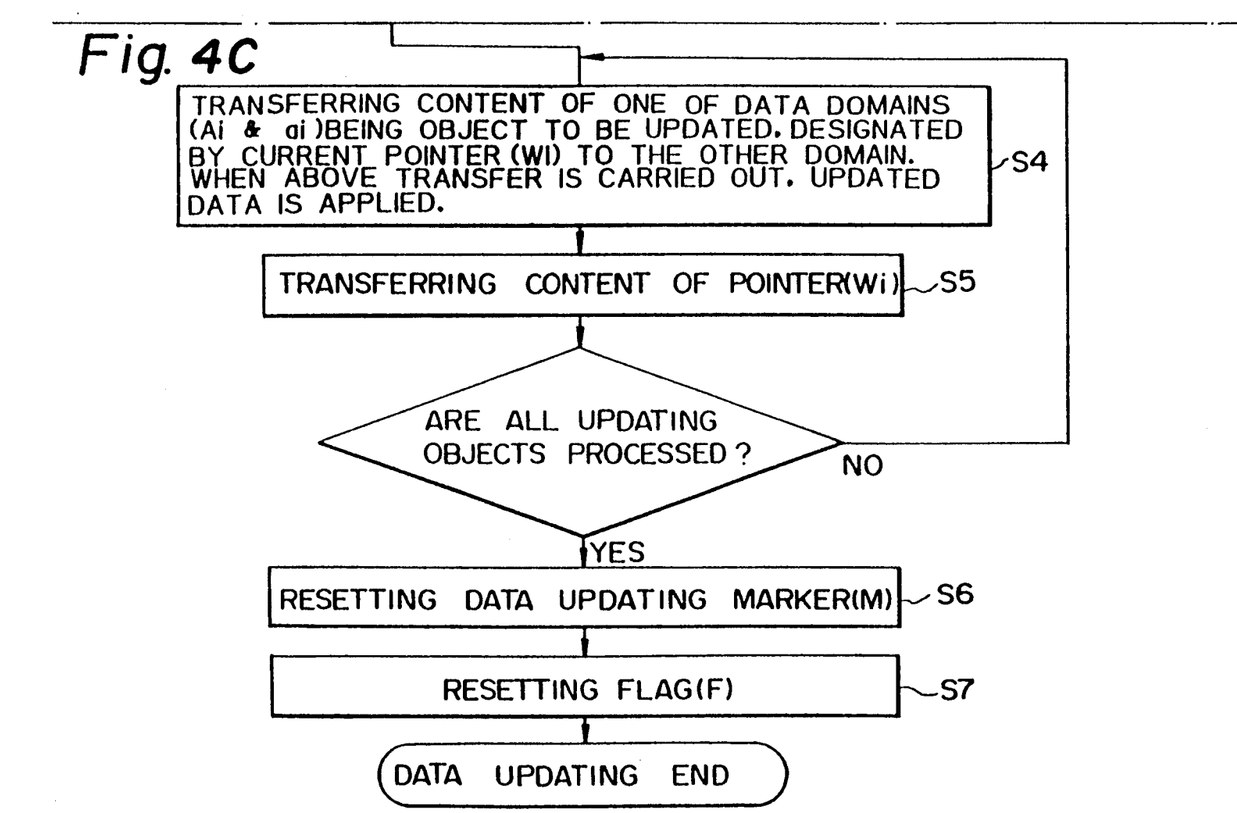
Figure 5:
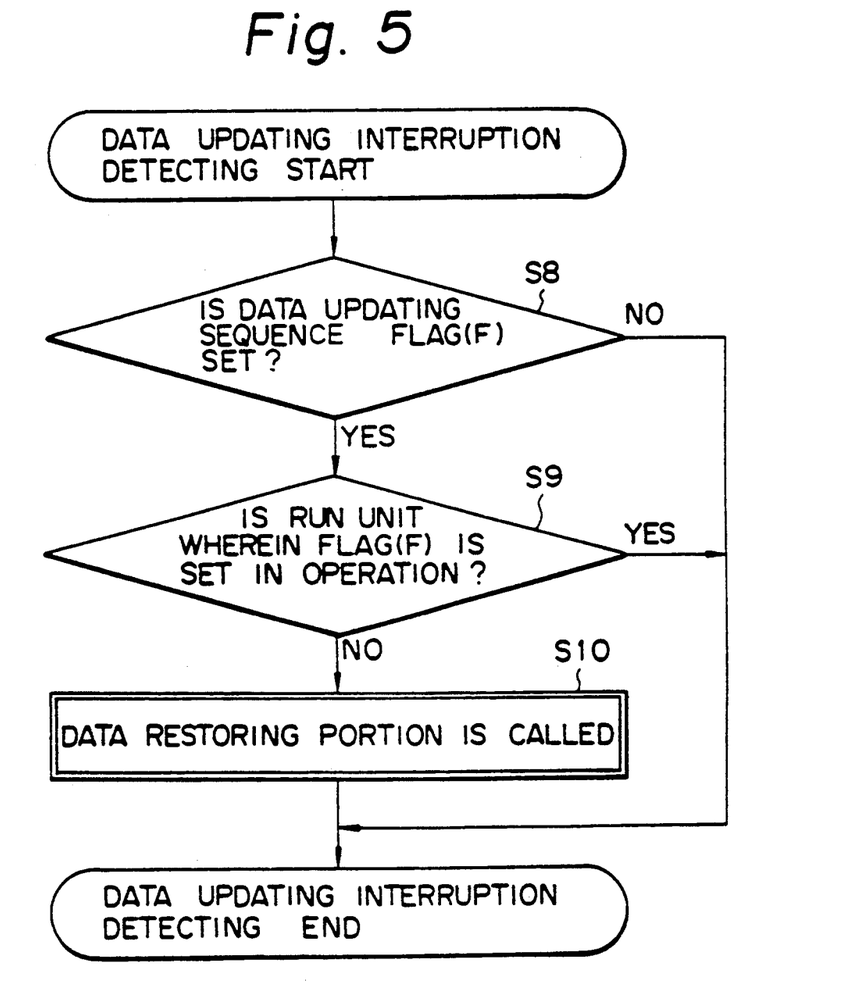
FIG. 5 is a flowchart showing process steps in a data updating interruption detection process of the embodiment of FIG. 1.
Figure 6:
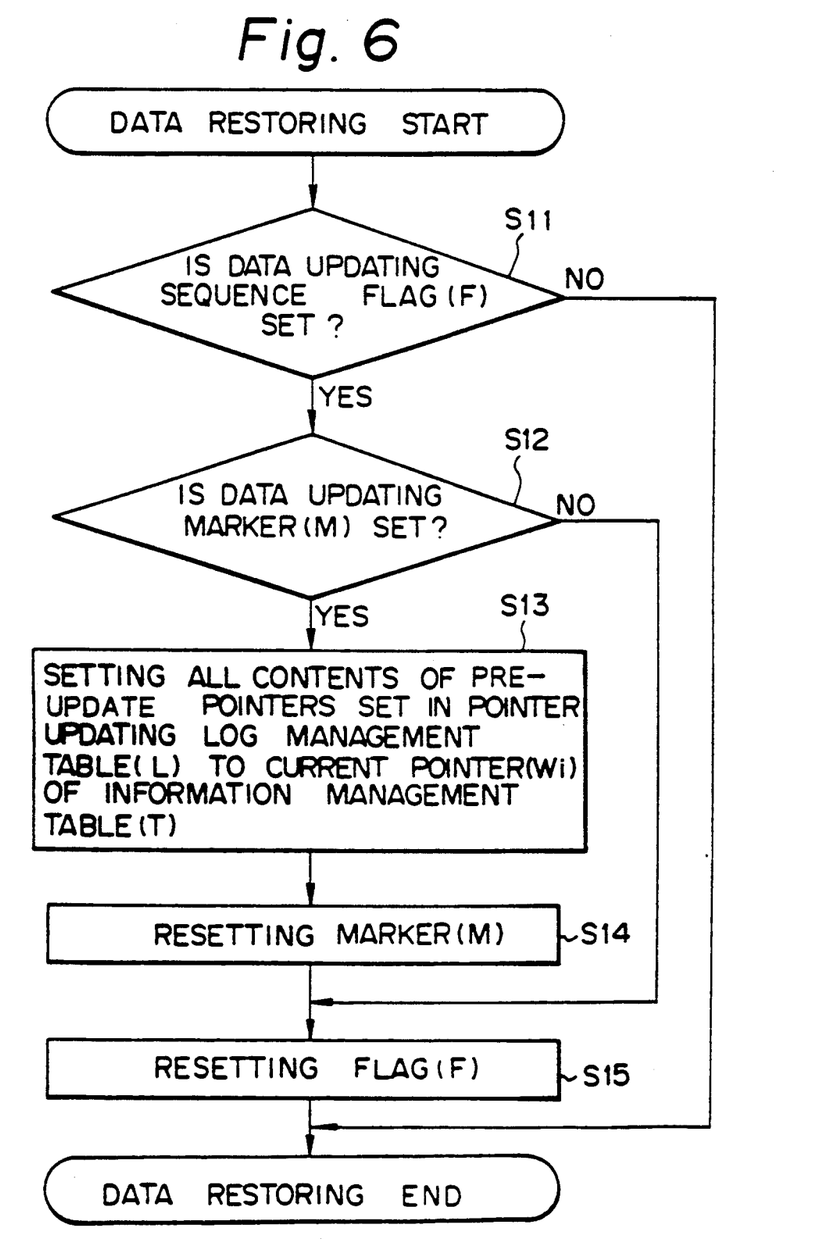
FIG. 6 is a flowchart showing process steps in a data restoring process of the embodiment of FIG. 1.

FIGS. 2A and 2B show the data updating process according to this embodiment in more detail, FIG. 3 is a block diagram for explaining process instructions transferred between elements in the system, FIG. 4 is a flowchart showing the data updating process, FIG. 5 is a flowchart showing the data updating interruption detection process, and FIG. 6 is a flowchart showing the data restoring process.

An example in which two data domains are updated is explained next with reference to FIGS. 2A and 2B.

As shown in FIG. 2A, two pairs of data domains A1, a1, and A2, a2 are shown. The data domains A1 and a1 store the same kind of data and are valid alternately. The some conditions apply to data domains A2 and a2.

Since the current pointer W1 in the information management table T, points to the data domain A1, the data domain A1 is currently storing valid data. And, since the current pointer W2 points to the data domain a2, the data domain a2 is currently storing valid data.

When the data is updated in order to assure consistency between the data domains, first as shown in FIG. 2A, the current pointers W1 and W2 are stored in L1 and L2 of the pointer updating log management table L, respectively.

Next, as shown in FIG. 2B, new data after updating is set into data domain a1, in accordance with the contents of data domain A1. Similarly, new data after updating is set into the data domain A2, in accordance with the contents of data domain a2.

After the new data are set in the data domain a1 and the data domain A2, as shown in FIG. 2B, the current pointers W1 and W2 in the information management Table T are updated to the data domains having the new data.

For example, when only the updating of the data domain a1 has been completed and the updating of the data domain A2 is not yet completed, if the updating process is interrupted, only by the restoring of the current pointers W1 and W2 from the pointer updating log management table L, can the contents of the data domain be restored and the consistency of the data be assured.

The concrete processes of this embodiment are explained with reference to the flowcharts of FIGS. 3 to 6. S1 to S15 in FIG. 3 correspond to the steps 1 to 15 in the flowcharts of FIGS. 4 to 6.

When an instruction to update the data is sent to the data updating processor 11 from an external process request portion 40 in which instruction, the data domains to be updated and the contents to be updated are designated, the data updating processor 11 executes the processes shown in FIG. 4, as follow:

S1:

After the reset of the data updating sequence flag F is assured, the flag F is set. If the flag F has been already set, the operation pauses until the reset is confirmed.

If the flag F is not reset within a predetermined time, a data updating interruption detection portion 41 is notified.

S2:

All the contents of the current pointers Wi pointing to the currently valid data domains set in the information management table T are stored in the pointer updating log management table L.

S3:

The data updating marker M is set.

S4:

The content of the data domain which is pointed to by the current pointer Wi and the currently valid data in the object data domains Ai and ai are transferred to, e.g., a main storage device, the transferred content of the data is changed, and the changed content is duplicated in the matching data domain of that pair.

S5:

The contents of the current pointer Wi are changed. Namely, the current pointer is changed to designate the data domain storing newly updated data.

The processes of steps S4 and S5 are repeated until all of the object data domains have been updated. After the repeated process ends, the process proceeds to step S6.

S6:

The data updating marker M is reset.

S7:

Finally, the data updating sequence flag F is reset and the data updating process ends.

The data updating interruption detection portion 41 shown in FIG. 3 is notified by the external process request portion 40 during the process of reading, the data domain and the detection of a failure, and it is determined whether the immediately proceeding updating process was completed normally or was interrupted, by the process shown in FIG. 5.

S8:

First, the data updating interruption detection portion 41 determines whether the data updating sequence flag F is set or not. If the flag F has not been set, it is determined that the immediately proceeding data updating process was not interrupted.

S9:

If the flag F is set, it is determined whether the run unit which set the flag F is currently in operation or not. If it is in operation, then the current updating process is not interrupted. If not in operation, it is determined that the run unit which set the flag F was abnormally stopped and the next process step S10 is executed.

S10:

Since the proceeding data updating process was interrupted, then an instruction to restore the data domain to its state before updating is sent to the data restoring processor 12. After that, the process of the data updating interruption detection portion 41 ends.

When the data restoring processor 12 shown in FIG. 3 receives an instruction from the data updating interruption detection portion 41, the data restoring processor 12 executes the process steps 11 to 15 shown in FIG. 6, as follow:

S11:

The data updating sequence flag F is checked to determine if the flag is set or not. If the flag is not set, the process ends.

S12:

Next, the data updating marker M is checked to determine if the marker is set or not. If the marker is not set, the process proceeds to step 15.

S13:

All the contents of the current pointer before updating which are set in the pointer updating log management table L, are set in the corresponding current pointer Wi in the information management table T.

S14:

The data updating marker M is reset.

S15:

Finally, the data updating sequence flag F is reset and the data restoring process ends.

By restoring each of the current pointers Wi to the state just before updating, the contents of the information management table T and the data domain are restored to the same state before updating. Accordingly, after the reading or updating process, the correct data domains can be used.

In the conventional art, the pre-update log or post-update log is stored in a separate domain which has no relation to the object data to be updated. Therefore, it is necessary to reread or rewrite the data.

In this invention, the data domains are constructed in pairs, and are managed by pointers, and accordingly, if the updating process is interrupted, just by controlling the pointer, the data can be restored.

Usually, since each of the data domains are not updated independently and the plurality of relevant data domains are updated together, it is necessary that consistency between each data domain is assured. Accordingly, when restoring data after an interruption of the updating process, all the contents of the data domains involved in the updating process must be restored to their state before updating.

More particularly, in this invention, the restoring of the plurality of data domains can be performed only by the simultaneous transfer of the current pointers, thus the consistency between the data is easily assured.

As explained above, this invention has the following effects.

(1) A high speed data updating process

In the conventional art, when updating data, a pre-update log or a post-update log must be stored in a separate storage device. In this invention, before data updating, only the duplication of the pointer group for the information management in another domain is executed, and as a result, high speed data updating can be realized.

(2) A high speed data restoring process

Since the processes of reading log data and updating the reading log data for restoring data are not necessary, a high speed data restoring process can be carried out.

(3) Possibility of data restoration when updating is interrupted

Since the data contents before updating are stored in one of a pair of domains, when a failure in a data domain occurs after the updating process is completed, the state of the data domains can be restored. This is a secondary effect. Namely, in one of the pair of domains, the logic information before updating remains intact, therefore, from this information, the state just before updating can be restored.

I claim:

1. An updating method for data groups stored in a data processing system comprising a nonvolatile storage device including a data storage portion comprising pairs of first and second data domains, an information management table including contents and for managing a current pointer, and a pointer updating log management table, said method comprising the steps of:

(a) storing contents of the current pointer managed by the information management table in the pointer updating log management table;

(b) transferring contents of a first data domain, which are an object to be updated and are designated by the current pointer, to a second data domain when data updating is carried out;

(c) changing the contents of the information management table from the current pointer to a new current pointer pointing to the second data domain in response to said step (b);

(d) restoring, when an interruption occurs during at least one of said steps (b) and (c), the contents of the pointer updating log management table current pointer into the information management table; and (e) providing an updating indicator indicating updating progress and said indicator allowing reversion to the first data domain when updating is not completed.

2. An updating method for data groups stored in a data processing system comprising a nonvolatile storage device including a data storage portion comprising pairs of first and second data domains, an information management table including contents and for managing a current pointer, and a pointer updating log management table, said method comprising the steps of:

(a) setting a data updating sequence flag used for indicating completion of data updating;

(b) storing contents of the current pointer managed by the information management table in the pointer updating log management table;

(c) transferring contents of a first data domain, which are an object to be updated and are designated by the current pointer, to a second data domain when data updating is carried out;

(d) changing the contents of the information management table from the current pointer to a new current pointer pointing to the second data domain in response to said step (b);

(e) restoring when an interruption occurs during at least one of said steps (c) and (d), the contents of the pointer updating log management table current pointer into the information management table; and (f) resetting the data updating sequence flag after one of said steps (d) and (e).

3. A method as set forth in claim 2, further comprising the steps of:

(g) setting a data updating marker used for indicating completion of pointer updating before said step (c); and (h) resetting the data updating marker after one of said steps (d) and (e).

4. A method as set forth in claim 3, wherein said step (e) comprises the substep of (e1) determining that the interruption has occurred when the data updating sequence flag is not reset within a predetermined time and a run unit which set the data updating sequence flag is not in operation.

5. A method as set forth in claim 2, wherein said step (e) comprises the substep of (e1) determining the interruption has occurred when at least the data updating sequence flag is not reset within a predetermined time period.

6. A system for executing an updating method for data groups stored in a nonvolatile storage device, comprising:

data storage means for storing data and comprising a first data domain and a second data domain which constitute a pair;

information management table means for managing a first pointer pointing to the first data domain, a second pointer pointing to the second data domain, and a current pointer pointing to one of the first and second data domains which stores currently valid data;

pointer updating log management table means for temporarily storing the current pointer before one of the pair of data domains is updated;

a data updating processor for updating data using the first, second and current pointers by first temporarily storing the current pointer in said pointer updating log management table means, by second updating one of the first and second data domains and by third changing the current pointer in said information management table means to a new current pointer pointing to the updated data domain after the updating of data; and a data restoring processor for restoring information in the one of the first and second data domains by setting contents of said information management table means to the current pointer stored in said pointer updating log management table means when said data updating processor is interrupted.

wherein said nonvolatile storage device further comprises a data updating sequence flag used for indicating completion of data updating;

wherein said data updating processor sets said data updating sequence flag when said data updating processor begins the updating and resets said data updating sequence flag when said data updating processor ends the updating; and wherein said data restoring processor resets said data updating sequence flag when said restoring processor ends the restoring.

7. A system as set forth in claim 6, wherein said nonvolatile storage device further comprises a data updating marker used for indicating completion of pointer updating;

wherein said data updating a processor sets said data updating marker after the current pointer is temporarily stored in said pointer updating log management table means and resets said data updating marker just before the reset of said data updating sequence flag.

* * * * *

UNITED STATES PATENT AND TRADEMARK OFFICE
CERTIFICATE OF CORRECTION

PATENT NO. : 5,327,551
DATED : July 5, 1994
INVENTOR(S) : Masamichi Kaneko

It is certified that error appears in the above-indentified patent and that said Letters Patent is hereby corrected as shown below:

On the title page, item [54] and column 1, line 3, "A" should be —TO—

Column 1, line 31, after "that" insert --,--.

Column 2, line 62, "Embodiment" should be --Embodiments--.

Column 3, line 60, "some" should be --same--.

Column 4, line 30, "follow" should be --follows--; line 66, delete ",".

Column 5, line 26, "follow" should be --follows--.

Column 7, line 7, after "restoring" insert --,--.

Column 8, line 20, "." should be --;--.

Signed and Sealed this

Twenty-fifth Day of October, 1994

Attest:

BRUCE LEHMAN

Attesting Officer

Commissioner of Patents and Trademarks